United States Patent [19]
Hall, Jr. et al.

[11] Patent Number: 5,175,429
[45] Date of Patent: Dec. 29, 1992

[54] STAND-OFF COMPENSATION FOR NUCLEAR MWD MEASUREMENT

[75] Inventors: Hugh E. Hall, Jr., Huntsville; James E. Meisner, Spring; Donald K. Steinman, Missouri City, all of Tex.

[73] Assignee: Baker Hughes Incorporated, Houston, Tex.

[21] Appl. No.: 753,322

[22] Filed: Aug. 30, 1991

[51] Int. Cl.⁵ .................. G01V 5/00; G01V 5/04; G01V 5/08

[52] U.S. Cl. .................. 250/262; 250/254; 250/256; 250/264; 250/269

[58] Field of Search ............. 280/254, 256, 262, 264, 280/265, 268, 269, 270

[56] References Cited

U.S. PATENT DOCUMENTS

| | | | |
|---|---|---|---|
| 3,023,507 | 3/1960 | Camp | 33/178 |
| 3,608,373 | 9/1971 | Youmans | 73/152 |
| 4,047,027 | 9/1977 | Bateman et al. | 250/264 |
| 4,665,511 | 5/1987 | Rodney et al. | 367/35 |
| 4,698,501 | 10/1987 | Paske | 250/265 |
| 4,769,541 | 9/1988 | Umiastowski et al. | 250/256 |
| 4,864,129 | 9/1989 | Paske et al. | 250/269 |
| 4,939,362 | 7/1990 | Supernaw et al. | 250/269 |
| 5,083,124 | 1/1992 | Nordstrom | 250/262 X |
| 5,091,644 | 2/1992 | Minette | 250/254 |

Primary Examiner—Constantine Hannaher
Assistant Examiner—Edward J. Glick
Attorney, Agent, or Firm—Richard T. Redano

[57] ABSTRACT

The present invention relates generally to increasing the accuracy of MWD nuclear based measurement systems. Specifically, the present invention provides a secondary measurement system for determining the tool displacement from the bore-hole wall for calculated compensation of nuclear measurement data.

10 Claims, 4 Drawing Sheets

STAND-OFF COMPENSATION FOR NUCLEAR MWD MEASUREMENT

BACKGROUND OF THE INVENTION

1. Field of the Invention

The present invention relates generally to increasing the accuracy of MWD nuclear based measurement systems. Specifically, the invention provides a secondary measurement system for determining the tool displacement from the bore-hole wall for calculated compensation of nuclear measurement data.

2. Prior Art

The measurement of formation properties during well drilling by "Measuring While Drilling" (MWD), systems provides the greatest accuracy and efficiency. Nuclear measurements such as neutron porosity and gamma-gamma density which employ a nuclear source and various spaced detector systems in an MWD tool, provide formation data which is fundamental for characterizing formation properties. Nuclear measurements, however, are limited in their accuracy in MWD systems by displacement from the bore-hole wall. The variability of displacement of the tool from the wall during drilling operations, combined with the influence of the drilling fluids present in the bore-hole on the detected values, limits usefulness of nuclear based measurement devices.

In wire line logging applications, displacement devices which force the measurement tool against the wall of the bore-hole are employed for increased accuracy. Disclosures demonstrative of this type of system are present in U.S. Pat. No. 3,023,507 to W. A. Camp, and U.S. Pat. No. 4,047,027 to Richard M. Bateman and Christian M. Clavier. Forced displacement is unsatisfactory for MWD application, and full gage stabilization of MWD tools has been employed to increase accuracy of nuclear base measurement systems. Full gage stabilization systems have included arrangements whereby the nuclear detectors are mounted in the fins of the stabilizers, or through the use of materials which are transmission transparent in the stabilizers which permit nuclear radiation to penetrate to sensors in the body of the tool. A system employing this arrangement is disclosed in U.S. Pat. No. 4,879,463 to Wraight et al. Full gage stabilization is impractical in some drilling applications rendering these techniques ineffective. Furthermore, when the bore-hole itself is out of gage even detectors on a stabilizer blade are inadequate as disclosed in the paper by D. Best, P. Wraight, and J. Holenka entitled 'An Innovative Approach to Correct Density Measurements While Drilling For Hole Size Effect", *Society of Professional Logging Engineers*, 31st Annual Logging Symposium, Jun. 24–27, 1990, paper G. Unconstrained motion of an MWD tool employing nuclear based measurement systems within the bore-hole results in a measurement response which is, at best, an average with varying amounts of drilling fluid present between the formation and the sensors for each measurement. This results in measurements with poor sensitivity to the properties of the formation, or requires the use of stronger sources which is undesirable from a cost and handling standpoint.

Nuclear measurement employs the statistical analysis of nuclear response or counts measured by the detector. Since data taken with the tool positioned closer to the bore-hole wall will represent the properties of the formation differently than measurements taken at greater displacement, and consequently, higher quantities of intervening drilling fluid, knowledge of the distance of the tool from the bore-hole wall may be employed to compensate the data for relative accuracy. An MWD detector response is not usually axisymmetric and the distance from the detector to the formation is required. It is therefore desireable to employ a secondary measurement device for determining the tool displacement from the bore-hole wall during nuclear measurement. The determination of the stand-off distance must be rapid with respect to the rotational speed of the MWD tool to allow accurate and timely measurement of the stand-off distance from the bore-hole wall when the tool is eccentered in the bore-hole. It is also desireable to simplify the compensation calculations by real time integration of nuclear data with stand-off distance measurement for efficiency in compensation calculation.

SUMMARY OF THE INVENTION

The present invention employs a memory for storage of count data from standard nuclear detectors and a stand-off transducer system controlling the memory for segregated storage of the detector data based on stand-off distance of the tool from the bore-hole wall. The memory in the present system is further segmented by detector and spectral energy levels for the nuclear data. Direct addressing of the memory based on stand-off distance, detector, and spectral level allows simple incrementing of the addressed memory location based on counts by the detector. A supplemental timing system is employed for determination of the total duration of the tool at particular stand-off distances to allow weighting of the count data in the calculation of formation properties.

Formation properties are determined by comparison of the data contained in the memory with corresponding predetermined response curves for calibrated variation of counting rates with known source to detector spacing and other environmental variables.

DETAILED DESCRIPTION

Figure 1:
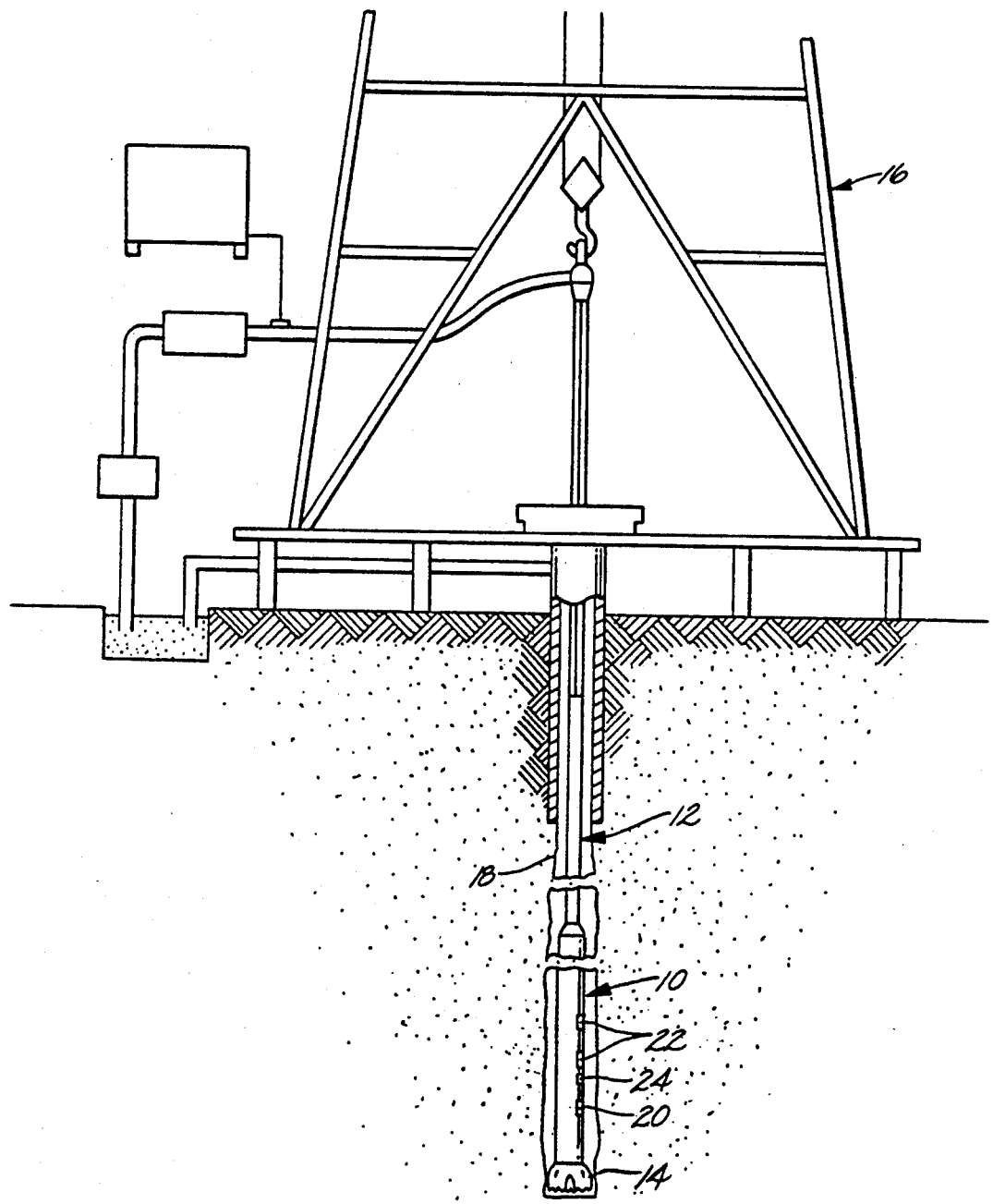
FIG. 1 is a generalized pictorial view of a drilling system employing MWD for determination of formation parameters.

The present invention is employed in an MWD system as shown in FIG. 1. The MWD tool 10 is mounted in a drill string 12 proximate the drilling bit 14. A standard drilling rig 16 is employed for control of the drill string in the bore-hole 18. Nuclear measurement of the formation properties is accomplished using a nuclear source 20 mounted in the tool with associated detectors 22. Those skilled in the art will recognize that the source and detectors employed may be selected for desired density or porosity measurement. A stand-off sensor 24 measures distance between the bore-hole wall and the MWD tool. As shown in FIG. 1, stand-off sensor or transducer 24 is located between nuclear source 20 and detectors 22. The stand-off transducer is mounted in alignment with the nuclear detectors on a longitudinal axis parallel to the central axis of the MWD tool. In the preferred embodiment, a sonic system is employed, however, any electromagnetic device may be used including light or microwave providing rapid sensing of the tool stand-off with respect to the rotation rate of the tool and anticipated displacement velocity of the tool for accurate position measurement. For simplicity, it is assumed that the speed of sound in the borehole fluid is constant such that the measured reflection time of the sonic pulse is directly proportional to the distance from the transducer located in the tool to the formation at a point on a radial line drawn perpendicular to the tool axis through the acoustic transducer. Design of the detectors should be such that the response pattern subtends a small arc on the circumference of the tool for accurate correlation between stand-off distance sensed by the stand-off measurement system and the nuclear counts received by the detector.

Figure 2:
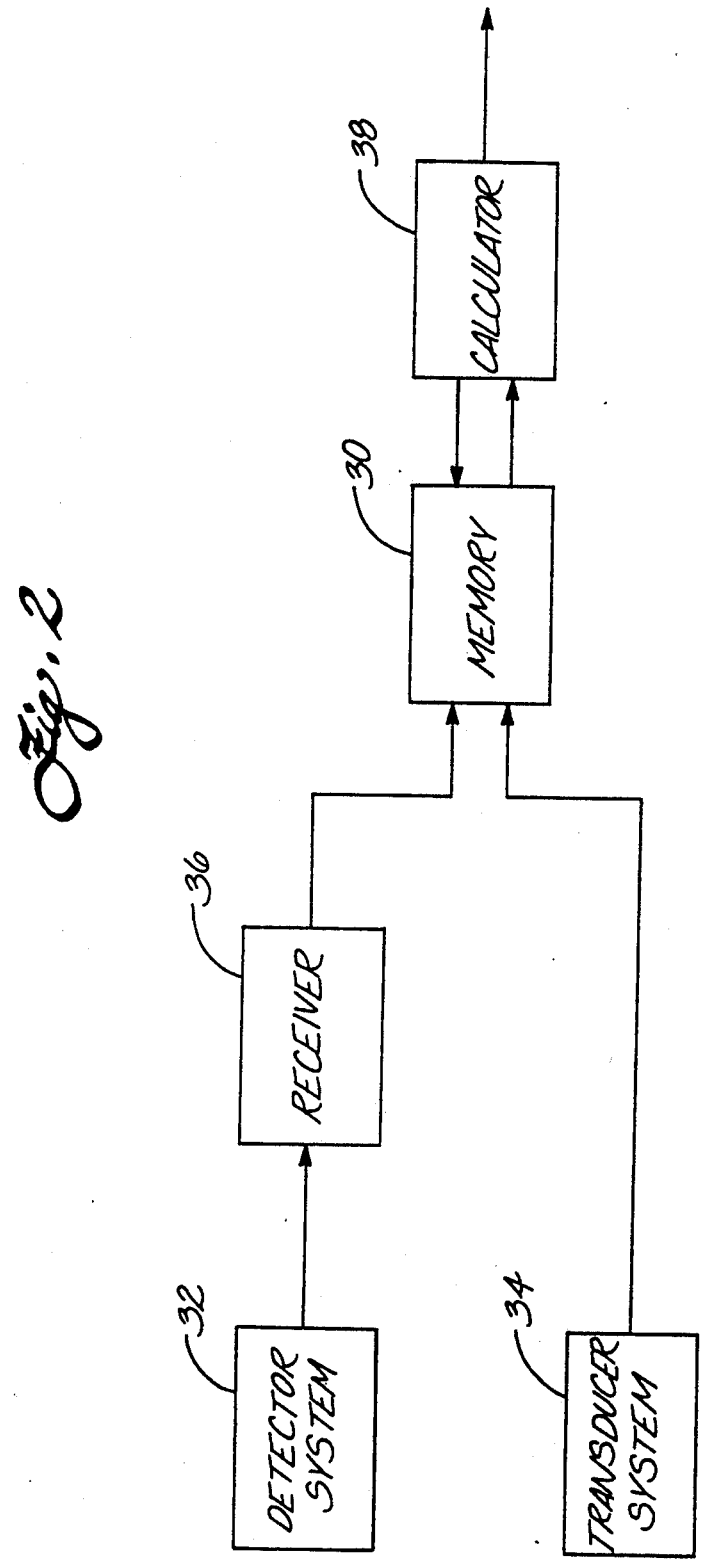
FIG. 2 is a general block diagram demonstrating the elements of the present invention and their interconnection.

The elements of the present invention are shown in FIG. 2. A memory 30 is employed to receive data from the nuclear detector system 32. The memory is segmented into "bins" corresponding to the stand-off distance. A transducer system 34 addresses the memory based on the stand-off distance measured thereby producing storage of the detector data transmitted to the memory through a receiver 36 in the appropriate bin. In the present embodiment, the receiver interprets the data from the detector to create a second portion of the memory address further segmenting the memory into levels corresponding to the spectrum of the nuclear counts received. The memory location addressed by the receiver and transducer represents the stand-off bin, and the spectrum level of the detected count thereby allowing simple incrementing of the memory location in response to the count. A calculator 38 address the memory to receive count data from the bins for comparison with a predetermined set of spectral response curves for the measurement parameter for which the detector has been calibrated at the stand-off distances represented by the bins in the memory. The calculator provides a determination of the formation data based on the time duration at the various stand-off distances and the spectral count values in the associated stand-off bins.

Figure 3:
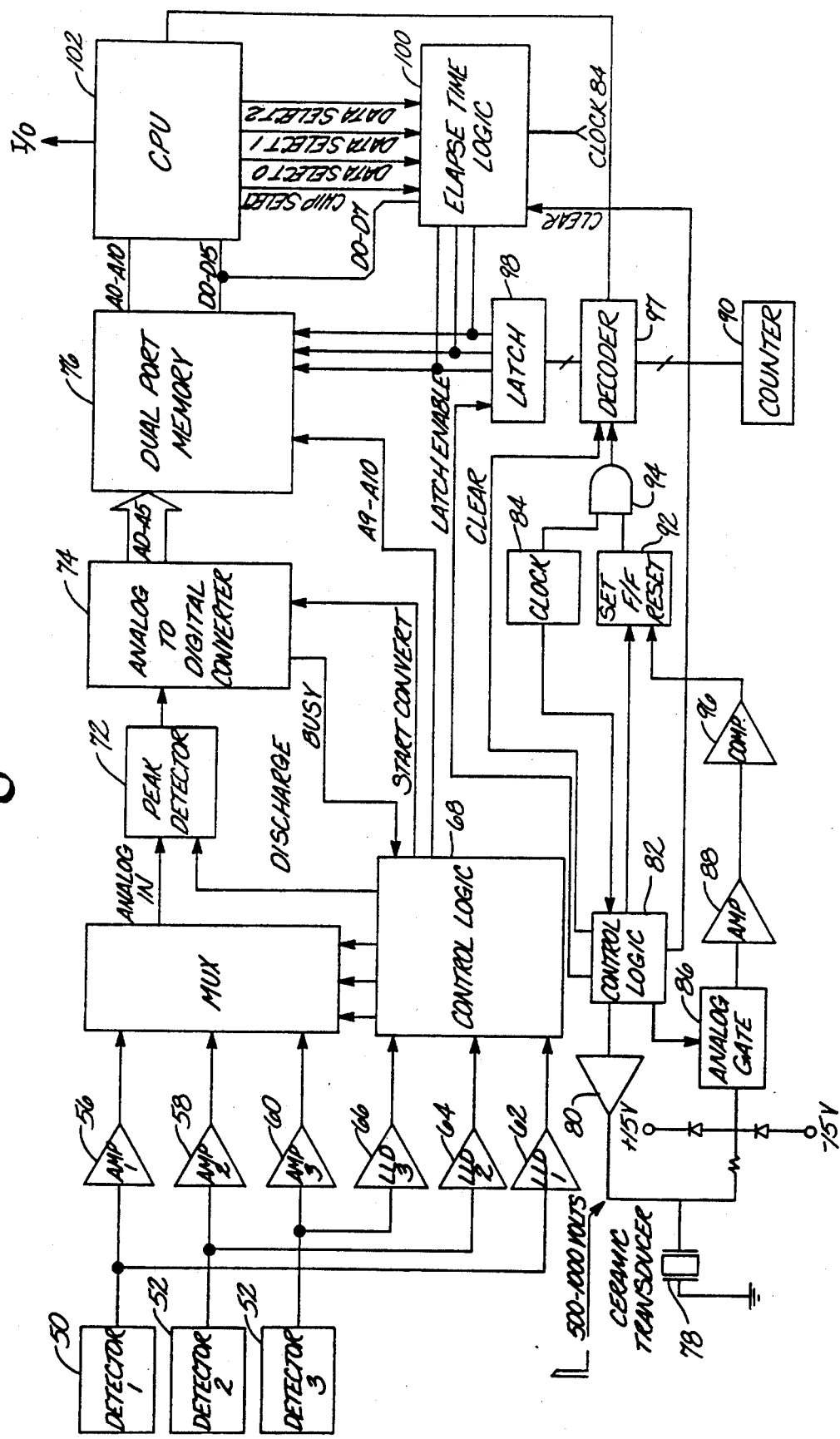
FIG. 3 is a detailed block diagram of a first embodiment of the invention.

A detailed embodiment of the elements of the present invention is shown in FIG. 3. In the embodiment shown in the drawings the detector system comprises three individual detectors 50, 52, and 54. Signals received from the detectors are processed through amplifiers 56, 58, and 60, respectively, which are the interface for the receiver system. Lower level discriminators 62, 64, and 66 identify the detection of a valid count by the respective detectors and identify the responding detector to detector control logic 68. A multiplexer 70 selects the detector receiving the count through assertion of a binary select signal from the control logic based on the LLD input. Three select signal lines are shown in the drawings which would allow expansion of the systems to use up to 8 detectors. The analog signal from the detector passed by the multiplexer is received by a peak detector 72 for conversion to a digital value through analog-to-digital converter 74. Timing of the analog-to-digital conversion is coordinated through the control logic with start-convert and busy signals. The control logic further provides timing and control for discharge of the peak detector between count events.

The detector control logic provides two address bits, A10 and A9 to a dual port memory 76. These address bits identify quadrants in the memory for storage of the count data based on the detector receiving the data as determined by the detector control logic. Those skilled in the art recognize that the number of detectors and associated address bits may be varied for specific implementations.

In the embodiment, shown in the invention, the transducer system comprises an ultrasonic caliper operating a frequency of 250 kilohertz with a wave length of 0.24 inches or 0.61 centimeters in sea water. A ceramic transducer 78 receives a 500 to 1,000 volt pulse from transmitter 80 initiated by transducer control logic 82. A clock 84 provides overall timing control for the transducer system. Upon initiation of the transmitter pulse, the transducer control logic analog gate 86 disconnects receiver amplifier 88 from the transducer until initial acoustic ringing in the system subsides. Protection diodes are provided in the system preventing damage to the gate by overpeak signals. The analog gate is employed by the transducer control logic, after sufficient timing to allow the acoustic ringing to subside, to allow transmission of the response signal received by the ceramic transducer to the amplifier. The transducer employs a counter 90 to establish a transit time of the pulse through the mud. The stand-off distance is then computed using the transit time with knowledge of the speed of sound in the mud. Upon firing the transmitter, the transducer control logic sets flip-flop 92 which gates the clock to the counter through AND gate 94. The received signal from the transducer is provided through the amplifier to a comparator 96 which detects the received signal and resets the flip-flop stopping the counter. The transducer logic provides a clear signal to the counter upon each firing of the transmitter.

The counter value is provided to decoder logic 97 which converts the count to a three bit address in the embodiment shown, which is then provided to a latch 98. A latch enable signal is provided by the transducer control logic upon the completion of the count and resetting of the flip-flop. The decoded counter value latched provides three bits of memory address designated A8, A7 and A6. These address bits segment the dual port memory into bins corresponding to the stand-off distance sensed by the transducer system. In the embodiment shown eight bins are available based on the three address bits provided. As will be described in greater detail subsequently, the variation of detector response becomes smaller with greater stand-off distance. Consequently, as stand-off distance increases, the corresponding bin "width" may be increased to conserve memory resources. The decoder converts the count value to the bin address for latching for the transducer shown in the present embodiment. The decoder is programmable by the CPU for alteration of the conversion of the counter-value to memory address. This capability allows variation of the bin widths of the memory for specific applications. For the 250 kHz system of the present embodiment in a 6¾ inch or 17.14 centimeters MWD tool with near gage stabilization, a first bin width corresponding to one-eighth inch or 0.32 centimeters provides a representative value. The compensation logic in the decoder would provide two bins having a width of one-eighth inch, or 0.32 centimeter two with one-quarter inch or 0.63 centimeters width, followed by bins with one-half or 1.27 centimeters inch, ¾ inch, or 1.90 centimeters and one inch or 7.62 centimeters widths with all counts detected at greater than three inches or 7.62 centimeters stored in a final bin.

The supplemental timing system of the present invention, as shown in FIG. 3, comprises elapsed time logic 100 which receives the latched three bits identifying the memory bin for the detected counts corresponding to the transducer stand-off. Continuous elapsed time counting for the latch value present provides a total time the detectors were within the stand-off bin. Data from the elapsed time logic on data lines D0 through D7 are provided for storage in the dual port memory at an initial storage location for each respective bin. Those skilled in the art will recognize that storage of this data may be accomplished by hardwiring data lines D0 through D7 to a specific memory location for each segment of the memory corresponding to individual bins selected by address lines A6 through A8.

Each detected value, as determined by the peak detector and converted through the analog to digital converter, creates the remaining bits A5 through A0 of the address for the dual port memory. These five bits provide 64 channels for definition of the spectrum corresponding to the nuclear counts received and discriminated by the peak detector. Each count received results in selection of one specific channel in the memory which is then incremented under the control of the detector control logic. Counts detected are thereby distributed to the 64 channels representing the spectrum detected and quantified through the peak detector and segregated by stand-off distance and detector for later parameter calculations.

Calculation of the compensated formation parameters is accomplished through CPU 102 in the embodiment shown in the drawings. The CPU employs ten address lines to fully address the dual port memory receiving the count data on data lines D8 through D15 and elapsed time data on data lines D0 through D7. The CPU provides control for storage of the elapsed time for each of the stand-off bins through the chip select and data select 0 through 2 lines as disclosed in the drawing.

In operation in an MWD system, the present invention as disclosed in FIG. 3 operates the transducer system continuously, maintaining a continuous determination of the stand-off distance present at the counter. Each detection of a count by detectors 1, 2, or 3 is determined by the respective LLD triggering the control logic for selection of the detector, through the multiplexer, to transfer the count signal to the peak detector. The peak detector determines the spectrum value associated with the count which is provided to the analog-to-digital converter. The control logic simultaneously asserts the latch enable, capturing the stand-off value determined by the transducer. The elapsed time logic is shifted to that bin by the latched signal. The dual port memory is addressed with the two most significant bits of the address provided by the control logic, based on the detector receiving the count, the second three bits identifying the bin determined by the stand-off, and the final six bits determining the channel of the spectrum to be incremented by the nuclear count. The spectrum data is thereby segregated in the dual port memory for analysis by the CPU in calculating the formation parameters.

Calculation of the formation parameters is accomplished using predetermined response curves calibrated for the tool based on stand-off distances using standard techniques. Employing neutron porosity tools as exemplary, FIG. 4 demonstrates the determination of characteristic length for neutrons employing the parameter $<L>$. The parameter $<L>$ is determined by performing a least squares fit to an exponential function of normalized counting rates identified as RC(R). RC(R) is determined based on the source detector spacing (R) providing data points designated by the x's in the graph. The slope of the curve comprises the value $1/<L>$. The parameter $<L'>$ is determined by least squares fit to the function $R^2C(R)$. The calculated values of this function are demonstrated by the data represented by the boxes and the slope of that curve comprises $1/<L'>$. Other mathematical functions describing the variation of counting rate with source detector spacing and other environmental variables may be used as appropriate. Those skilled in the art will recognize application of parameters describing the behavior of neutrons or gamma rays that convey properties of interest for formation evaluation of oil or gas production.

Figure 4:
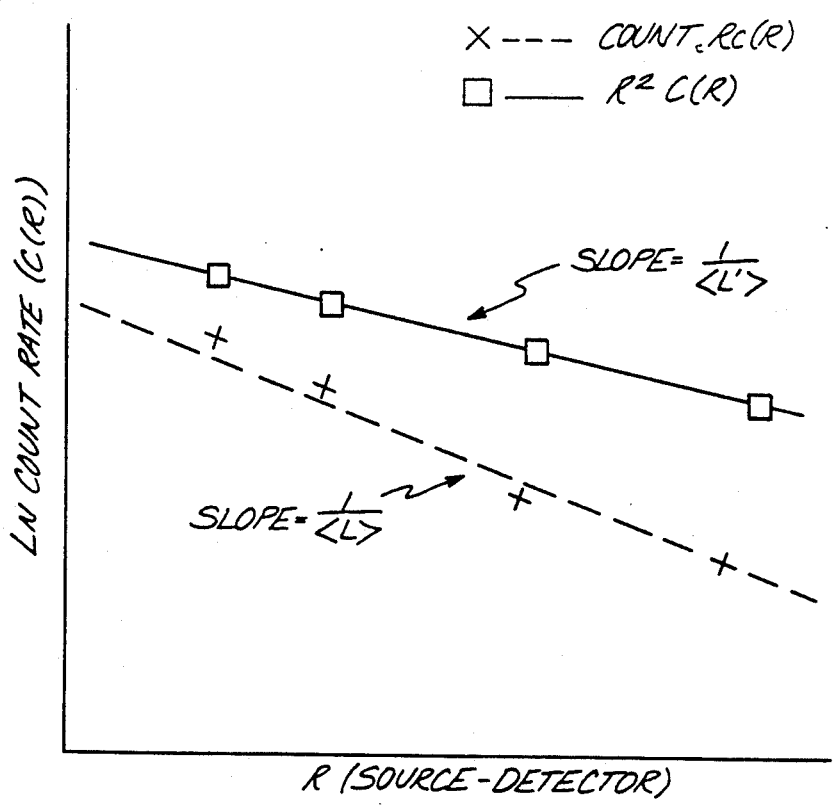
FIG. 4 is a graph demonstrating calculation of the characteristic lengths for neutrons as a function of distance between the neutron source and neutron detector.
Figure 5:
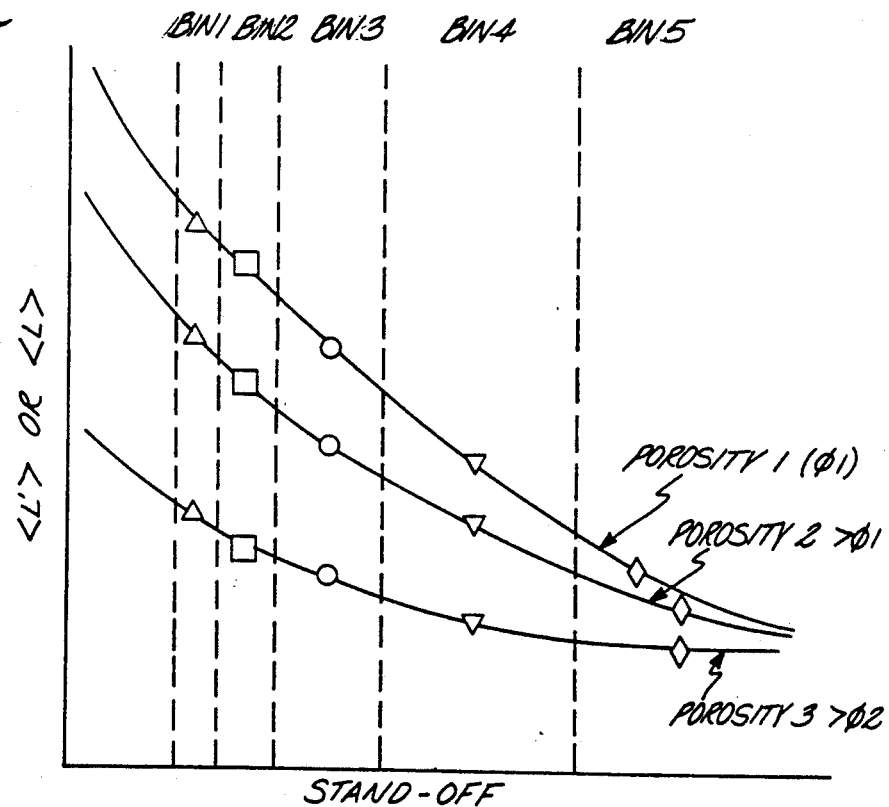
FIG. 5 is a graph demonstrating the variation of the characteristic lengths as a function of stand-off distance between the neutron detector and the bore-hole wall.

FIG. 5 demonstrates the application of the data determined using the techniques described with respect to FIG. 4 for various stand-off distances corresponding to the stand-off bins created in the memory of the present invention. As exemplary, the value of $<L'>$ or $<L>$ for varying porosities calibrated at a stand-off distance corresponding to bin 1 of the present invention, are designated by the triangles on the porosity curves. The $<L'>$ or $<L>$ values for the same three porosity levels calibrated a stand-off distance corresponding to bin 2 are represented by squares, while calibrated values for bins 3, 4, and 5 are represented by circles, inverted triangles, and diamonds, respectively.

Since the stand-off of the tool cannot be controlled, the stand-off distance, as determined by the ultrasonic transducer in the present embodiment, is employed to store the count data received in the appropriate memory bins. The CPU of the present invention compares the data present in the memory bins with precalibrated porosity or other parameter curves for each of the bins with appropriate weighting based on time of tool residence at the corresponding stand-off for determination of the parameter value. Those skilled in the art will recognize that the use of standard interpolation programs for fitting of data to the calibration curves may be employed.

Having now described the invention in detail as required by the patent statues, those skilled in the art will recognize modifications and refinements to the embodiments disclosed for specific applications, including number and location of detectors, transducer type, calibration parameters, and calculation functions. Such modifications and enhancements are within the scope of the present invention as identified in the following claims.

What is claimed is:

1. A system for stand-off compensation of nuclear measurement data received by at least one detector in an MWD system operating in a bore-hole comprising:
    a) a nuclear source capable of emitting radiation to be received by the at least one detector;
    b) means for receiving data from the at least one detector;
    c) a stand-off transducer located between said nuclear source and the at least one detector, for determining distance of the at least one detector from the bore-hole wall, the transducer providing an output signal;

d) a segmented memory connected to the receiving means for storing the data, the segment of segmented memory which stores the data activated responsive to the transducer output signal; and e) calculation means connected to the memory to retrieve the data from each segment and process the data based on the segment from which it was retrieved.

2. A system for stand-off compensation as defined in claim 1 further comprising timing means for determining the accumulated time the transducer output signal addresses each segment of the memory.

3. A system for stand-off compensation as defined in claim 1 wherein the transducer comprises an acoustic signal generator and receiver.

4. A system for stand-off compensation as defined in claim 3 wherein the transducer output signal comprises a count value determined by a clock;

means for initiating the count in response to a generated acoustic pulse, and terminating the count upon receiving a pulse designating stand-off distance.

5. A system for stand-off compensation as defined in claim 1 wherein the stand-off transducer determines stand-off distance repetitively at a rate which is rapid with respect to rotation of the MWD tool.

6. A system for stand-off compensation as defined in claim 1 wherein the stand-off transducer is mounted in alignment with the at least one detector parallel to a longitudinal axis of the MWD tool.

7. A system for stand-off compensation of nuclear measurement data received by at least one detector in an MWD system operating in a bore-hole comprising:

a) a nuclear source capable of emitting radiation to be received by the at least one detector;

b) means for receiving data from the at least one detector and determining a peak value for the data designating a count;

c) means for converting the data to a digital address identifying a channel corresponding to the determined peak value, d) a stand-off transducer located between said nuclear source and the at least one detector, for determining distance of the at least one detector from the bore-hole wall, the transducer providing a digital bin address corresponding to one of a plurality of stand-off distances represented by bins corresponding to the bin address;

e) a memory addressed by a combination of the channel address and bin address, said memory incremented for each data count; and f) calculation means connected to the memory to retrieve the count values corresponding to each channel and bin for comparison to predetermined parameter data calibrated at stand-off distances representative of the bins.

8. A system for stand-off compensation as defined in claim 7 wherein the address provided by the transducer correspond to a bin address representative of the stand-off distance and further comprising a plurality of timing means, each of said timing means corresponding to a bin, said timing means activated to accumulate time for each bin address.

9. A method for stand-off compensation of nuclear measurement data resulting from radiation generated by a nuclear source comprising:

a) receiving nuclear response data in a detector;

b) determining a peak value of the data;

c) converting the peak value to a channel address;

d) determining the stand-off distance of the detector from the bore-hole wall with a transducer located between the nuclear source and the detector;

e) creating a bin address based on the stand-off distance;

f) addressing a memory by combining the channel address and bin address to form a memory address; and g) incrementing the memory for each nuclear response detected at the bin and channel identified by the memory address.

10. A system for stand-off compensation of nuclear measurement data resulting from radiation generated by a nuclear source and received by a plurality of detectors in an MWD system operating in a bore-hole comprising:

a) means for receiving data from each detector;

b) means for determining the detector receiving a count;

c) means for establishing a detector address responsive to the determined detector;

d) means for determining a spectrum channel responsive to the detected count;

e) means for establishing a channel address responsive to the determined channel;

f) means for determining a stand-off distance of the detectors from the bore-hole wall, said means located between the nuclear source and the plurality of detectors;

g) means for establishing a bin address corresponding to the stand-off distance;

h) a memory addressed by the detector address, bin address, and channel address in combination creating a memory address;

i) a memory location corresponding to the memory address incremented when addressed; and j) calculation means for comparing the data at each memory address with predetermined parameter data for the detector receiving the count calibrated at stand-off distances corresponding to stand-off distances identified by the bin address.

* * * * *